Patented Jan. 9, 1951

2,537,592

UNITED STATES PATENT OFFICE 2,537,592

2-SULFANILAMIDO-5-BROMOTHIAZOLES

Lucas P. Kyrides and Ferdinand B. Zienty, St. Louis, Mo., assignors to Monsanto Chemical Company, St. Louis, Mo., a corporation of Delaware No Drawing. Original application July 29, 1944, Serial No. 547,276. Divided and this application September 17, 1945, Serial No. 616,968

3 Claims. (Cl. 260—239.95)

This invention relates to certain brominated heterocyclic compounds and more particularly to a method of brominating certain heterocyclic compounds and to certain new and valuable mono-bromo amino-substituted heterocyclic compounds containing nitrogen and sulfur or selenium and their corresponding sulfanilyl derivatives.

This application is a division of my copending application, Serial Number 547,276, filed July 29, 1944, now Patent 2,457,078.

The substitution of bromine for hydrogen in many heterocyclic compounds is accomplished generally by adding bromine to a cooled mixture of the heterocyclic compound and an acid such as sulfuric acid, maintaining the reaction mixture cool during the reaction, and recovering the brominated product substantially at the temperature of the reaction or at a lower temperature. These low temperature procedures were employed prior to the present invention presumably because decomposition of the desired product was expected to take place at higher temperatures. However, there are instances in which the bromination at the lower temperatures results in products other than those which are desired from the reaction. For example, while 2-amino-4-methylthiazole may be brominated and the resulting 2-amino-4-methyl-5-bromothiazole recovered at the lower temperatures, we have found that the bromination of 2-aminothiazole according to this procedure results in a product which has two ionizable bromine residues per molecule, as evidenced by titration with a standard silver nitrate solution. Moreover, the yields were poor, and the product failed to react satisfactorily with N-acetyl-sulfanilyl chloride, producing large amounts of tar.

The object of this invention is to provide a novel bromination procedure for substituting bromine for hydrogen in the ring structure of certain heterocyclic compounds.

A further object is to provide a novel process for brominating 2-aminothiazole and its derivatives.

Another object is to provide certain novel brominated amino-substituted 5-membered heterocyclic compounds.

Another object is to provide certain novel sulfanilyl derivatives of certain brominated amino-substituted 5-membered heterocyclic compounds.

Another object is to provide a novel brominated 2-aminothiazole.

Another object is to provide a novel sulfanilyl bromo derivative of 2-aminothiazole.

Other objects will be apparent from the following description and examples.

According to the present invention, generally stated, certain heterocyclic compounds may be brominated by heating a mixture of the compound with an acidic substance or an acid, such as, hydrobromic acid, hydriodic acid, hydrochloric acid, or sulfuric acid, and water to the temperature of refluence of the mixture and thereupon slowly adding an equivalent amount of bromine to the mixture. The reaction is exothermic, and the temperature of the reaction mixture is maintained at reflux temperature during the reaction substantially without the aid of external heat. When all of the bromine has been added, and the reaction has subsided, the reaction mixture is cooled with agitation, for example to room temperature. The product is isolated from the reaction mixture by any desired method; for example, when the product separates out on cooling to room temperature, the product may be filtered off and air-dried. If the product remains in solution after cooling to room temperature, the solution may be evaporated to induce a precipitation of the product. If the product is precipitated while the solution is hot or at the boiling point, it may be desirable to filter the solution while it is hot to effect a more efficient removal of impurities dissolved in the mother liquor.

The bromination process of the present invention is applicable to the bromination of an olefinic carbon atom of 5-membered amino-substituted heterocyclic compounds which contain in the ring structure at least one nitrogen atom, at least one sulfur or selenium atom and a formation in the ring represented by

and which are stable in the presence of acids or acidic substances. Some of the heterocyclic compounds to which the process of the present invention applies are the aminothiazoles, the aminoselenazoles, the 4-alkyl and 4-alkenyl-aminothiazoles and aminoselenazoles, the alkyl aminothiazoles and aminoselenazoles, 2-amino-1,3,4-thiadiazole and 2-alkyl-amino-1,3,4-thiadiazoles. The resulting mono-bromo compounds are useful as anti-bacterial and anti-protozoal agents and as intermediates for the preparation of pharmaceuticals, dyestuffs, textile treating agents and fungicides. The N-sulfanilyl derivatives of these compounds are of particular interest in combating micro-organisms.

When the process of the present invention is applied to the bromination of 2-aminothiazole, the product recovered from the reaction mixture is 2-amino-5-bromothiazole hydrobromide, having the formula:

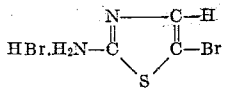

The melting point of the crude product as recovered from the reaction mixture was 140–142° C., and the melting point of the product after one recrystallization from water was 141–142° C. The melting point of the product after two additional recrystallizations from water was 144–145° C. The free base is obtained by neutralization of the hydrobromide with an alkali.

The product resulting from the bromination of 2-aminothiazole by the method of the present invention has been found to react in the free base form with N-acetyl-sulfanilyl chloride to produce the novel compound, 2-N⁴-acetyl-sulfanilamido-5-bromothiazole. This compound is then hydrolyzed with alkali to yield the compound 2-sulfanilamido-5-bromothiazole, having the formula:

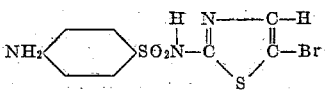

This compound has been found to possess outstanding utility as an anti-bacterial and anti-protozoal agent in combating micro-organisms in vivo in instances in which many sulfa drugs are inactive.

As an alternative embodiment of the process of the present invention, the bromination may be conducted at relatively low temperatures, for example, −5 to 55° C., and the resulting reaction mixture then heated to the boiling point and boiled for a short time, for example several minutes. The bromination may be conducted at temperatures just above the freezing point of the reaction mixture, which in some instances may be as low as −10° C., or even lower. Following the bromination operation, the reaction mixture is then heated to the boiling point for a short time.

As a further alternative embodiment of the process of the present invention, the addition of bromine to the reaction mixture may be effected during the operation of heating the solution to the boiling point, proceeding cautiously, however, in view of the fact that the bromination reaction is exothermic.

The following examples will serve to illustrate the novel process and products of the present invention. These examples are to be construed merely as illustrative and not as limiting the scope of the invention, which is applicable to the bromination of heterocyclic compounds of the type hereinbefore described.

*Example I*

A mixture of 150 g. (1.5 moles) of 2-aminothiazole, 300 cc. of water and 250 g. of 48% hydrobromic acid (1.5 moles) was heated to reflux temperature, and 240 g. (1.5 moles) (77.4 cc.) of bromine was added to the mixture over a period of about 35 minutes. The bromination reaction was exothermic, since the batch remained at reflux temperature without external heating during the addition of the bromine. When all the bromine had been added, the mixture was cooled to 25° C. with stirring and the crystals which separated out were filtered and air-dried. Yield, 180 g. of pink crystals; melting point 140–141° C. The product was 2-amino-5-bromothiazole hydrobromide. This salt was recrystallized from water, using 160 cc. and 5.0 g. of decolorizing charcoal for every 100 g. of 2-amino-5-bromothiazole hydrobromide. The filtered liquor was treated with 0.1 g. of sodium hydrosulfite and cooled to 15° C. The crystals which separated were filtered off and dried. The melting point was 141–142° C. The 2-amino-5-bromothiazole hydrobromide was found to contain ½ molecule of water of crystallization as shown by titration, using the Karl Fischer method. Assay, 100.6% of the hydrate by titration with silver nitrate. Non-ionizable bromine 30.1%; theory 30.8%. Ionizable bromine 30.2%; theory 30.8%. The 2-amino-5-bromothiazole hydrobromide is useful as an anti-bacterial agent, and as an intermediate in the preparation of dyestuffs, textile treating agents, fungicides, insecticide toxicants and pharmaceuticals. After two additional recrystallizations from water, the product melted at 144–145° C.

*Example II*

A slurry of 100 g. of wet recrystallized 2-amino-5-bromothiazole, prepared according to the method of Example I and containing less than 5% moisture, and 400 cc. of water was stirred and cooled below 5° C. A solution of 32.0 g. of 50% sodium hydroxide in 50 cc. of water was added to this solution by means of a dropping funnel, the temperature of the batch being maintained below 5° C. The mixture was just alkaline to phenol-phthalein at the end of the neutralization; 0.3 g. of sodium hydrosulfite was added, and the mixture was stirred for 1 hr. at 5° C. The gray-brown crystals of 2-amino-5-bromothiazole were filtered off and dried in the air. Melting point of the crude product, 102–103° C., forming a black melt. Yield, 63.2 g. (98%). The free base 2-amino-5-bromothiazole was recrystallized from water, using 300 cc. of water and 0.4 g. of decolorizing charcoal for each 10 g. of the amine. Recovery, 81%; melting point 105–106° C. The 2-amino-5-bromothiazole is useful as an anti-bacterial agent and as an intermediate in the preparation of dyestuffs, pharmaceuticals, textile treating agents, fungicides and insecticides.

*Example III*

300 cc. of anhydrous pyridine was cooled to 5° C., and 25.6 g. (0.142 mole) of 2-amino-5-bromothiazole, prepared according to the method of Example II, was added. A solution of the amine in pyridine was formed when the mixture was agitated. 40 g. (20% excess) of N-acetyl-sulfanilyl chloride was added to the solution over a period of about 15 min., keeping the temperature of the batch below 5° C. The mixture was stirred for about 15 hrs. at a temperature below 5° C. Water was added, pyridine was distilled out under reduced pressure, and the precipitate was filtered off and washed thoroughly with water. After drying at 60° C. the product weighed 30.7 g. (69% yield). The product was 2-N⁴-acetyl-sulfanilamido-5-bromothiazole. It is useful as an anti-bacterial agent and in the preparation of fungicides and in the treatment of textiles.

*Example IV*

A solution of 33.8 g. (0.01 mole) of 2-N⁴-acetyl-sulfanilamido-5-bromothiazole, prepared according to the method of Example III, in 520 cc. of 2% sodium hydroxide was refluxed for 1½ hrs.

2 g. of decolorizing charcoal were added, and the mixture was filtered hot. The filtrate was cooled to 30° C., and a solution of 16 cc. of concentrated hydrochloric acid in 100 cc. of water was added to the filtrate over a period of about 1 hr. until the mixture was acid to litmus. The crystalline product was filtered off, washed with water and dried. The product was 2-sulfanilamido-5-bromothiazole. Weight, 26.1 g. (87% yield). The 2 - sulfanilamido-5-bromothiazole was purified by recrystallization from 50% acetone; yellow crystals. The melting point was indistinct; decomposition took place above 190° C. Assay 101% by alkali titration in acetone, using a phenolphthalein indicator. The product is useful as an anti-bacterial agent, anti-protozoal agent, fungicide and textile treating agent.

Example V

A solution of 15 g. of sulfuric acid in 100 cc. of water was prepared and cooled to 25° C. To this solution 25 g. of 2-aminothiazole was added. When the solid material was dissolved, the temperature of the resulting solution was raised to 55° C. and held at that temperature by means of external cooling while 36 g. of bromine (11.5 cc.) was slowly added. After the reaction was complete, the solution was heated to boiling and boiled for approximately 2 min. to remove excess bromine. Thereafter the solution was cooled approximately to room temperature, or 25° to 30° C., and allowed to stand at that temperature. Crystals of 2-amino-5-bromothiazole hydrobromide separated from the solution and were filtered off and dried. Yield 6.5 g.; melting point 139–141° C. The filtrate was cooled to a temperature slightly below 5° C., whereupon a second crop of crystals was obtained. These were filtered off and dried. Melting point 140–142° C. The remaining liquid was evaporated to a small volume and cooled. A third crop of crystals was obtained. Melting point 139–140° C. Total yield 13.9 g. or 23%. Non-ionizable bromine 30.2%; theory 30.8%. Ionizable bromine 29%; theory 30.8%. Melting point after one crystallization from water, 141–142° C.; melting point after two additional recrystallizations from water, 144–145° C.

Example VI

A solution of 25 g. of sulfuric acid in 20 cc. of water was cooled to 30° C. To this solution 50 g. of 2-aminothiazole was added and dissolved therein. The temperature of the solution was brought to 30° C. and held at that point by means of external cooling while 40 g. of bromine (12.9 cc.) was slowly added. The solution was stirred over-night. The following day 40 g. of bromine were added over a 2-hr. period, the temperature being maintained at 30° C. The solution was evaporated at room temperature to a small volume. Crystals separated out and were filtered off and dried. Yield 63 g. Ionizable bromine 58%; theory for 2-amino-5-bromothiazole hydrobromide, 30.8%. This example illustrates the result of applying the customary procedure in endeavoring to brominate 2-aminothiazole. The melting point of the resulting product was found to be below 115° C. Attempts to form the N-acetyl sulfanilyl derivative of the product were unsuccessful. However, if the bromination reaction mixture is heated to the boiling point for several minutes before recovery of the product, the desired 2-amino-5-bromothiazole compound is obtained.

Example VII 2-aminoselenazole may be brominated according to the process described in Example I. The resulting product is 2-amino-5-bromoselenazole hydrobromide, having the formula:

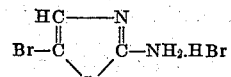

Example VIII

The process described in Example I may be repeated using 2-methylaminothiazole in place of 2-aminothiazole. The resulting product is 2-methylamino - 5 - bromothiazole hydrobromide, having the formula:

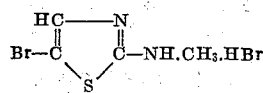

Other alkyl and alkenyl residues having from 1–22 carbon atoms may be substituted for the methyl group on the amino residue, for example, the ethyl, isopropyl, butyl, amyl, octyl, decyl, dodecyl, heptadecenyl and eicosyl residues.

Example IX

The process of Example I may be repeated using 2-amino-1,3,4-thiadiazole. The resulting product is 2-amino-5-bromo-1,3,4-thiadiazole, having the formula:

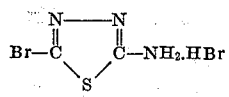

Example X 2-methylamino-1,3,4-thiadiazole may be brominated according to the method of Example I. The resulting product is 2-methylamino-5-bromo-1,3,4-thiadiazole hydrobromide, having the formula:

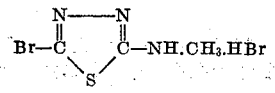

Example XI 2-amino-4-methylthiazole may be brominated according to the method of Example I. The resulting product is 2-amino-4-methyl-5-bromothiazole hydrobromide, having the formula:

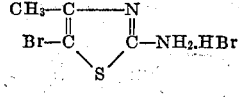

Other alkyl and alkenyl residues having from 1–22 carbon atoms may be substituted for the methyl group on the ring structure, for example, the ethyl, isopropyl, butyl, amyl, octyl, decyl, dodecyl, heptadecenyl and eicosyl residues.

Example XII 2-amino-4-ethylselenazole may be brominated according to the process described in Example II. The resulting product is 2-amino-4-ethyl-5-bromoselenazole hydrobromide, having the formula:

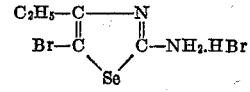

Other alkyl and alkenyl residues having from 1–22 carbon atoms may be substituted for the ethyl group on the ring, for example, the methyl, isopropyl, butyl, amyl, octyl, decyl, dodecyl, heptadecenyl and eicosyl residues.

*Example XIII*

The process of Example I may be repeated, using 2-methylamino-4-amylthiazole in place of 2-aminothiazole. The resulting product is 2-methyl-amino-4-amyl-5-bromothiazole hydrobromide, having the formula:

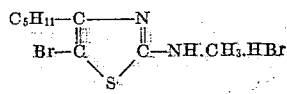

Other alkyl and alkenyl residues having from 1-22 carbon atoms may be substituted for the amyl residue on the ring structure and the methyl residue on the amino group, for example, the ethyl, isopropyl, butyl, octyl, decyl, dodecyl, heptadecenyl and eicosyl residues.

*Example XIV*

The free base derivatives of the bromo compounds described in Examples VII-XIII may be prepared by alkalinization of the hydrobromide salts according to the method of Example II. The $N^4$-acetyl-sulfanilamido derivatives of the free base bromo compounds corresponding to the hydrobromide salt compounds of Examples VII-XIII may be prepared according to the method of Example III. The acetyl residue in the resulting compounds may be hydrolyzed off by the method of Example IV. The resulting 2-sulfanilamido bromo compounds are:

*Example VII.*—2-sulfanilamido-5-bromoselenazole, having the formula:

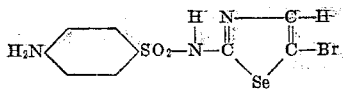

*Example VIII.*—$N'$-methyl-2-sulfanilamido-5-bromothiazole, having the formula:

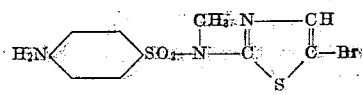

*Example IX.*—2-sulfanilamido-5-bromo-1,3,4-thiadiazole, having the formula:

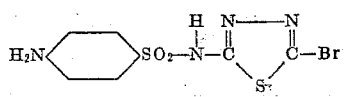

*Example X.*—$N'$-methyl-2-sulfanilamido-5-bromo-1,3,4-thiadiazole, having the formula:

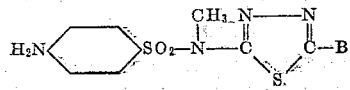

*Example XI.*—2-sulfanilamido-4-methyl-5-bromothiazole, having the formula:

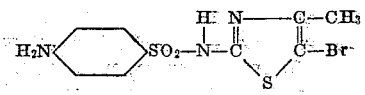

*Example XII.*—2-sulfanilamido-4-ethyl-5-bromoselenazole, having the formula:

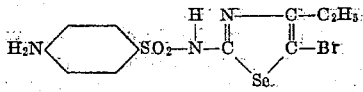

*Example XIII.*—$N'$-methyl-2-sulfanilamido-4-amyl-5-bromothiazole, having the formula:

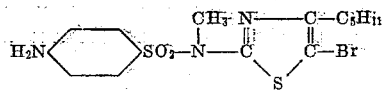

The sulfanilamido bromo derivatives of the compounds of Examples VII, IX, XI and XII may be employed as anti-bacterial agents, as insecticide toxicants and as surface-active agents.

We claim:

1. As a new chemical compound, a 2-sulfanamido-5-bromothiazole, having the formula:

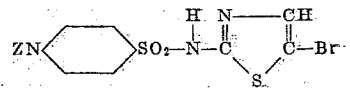

wherein ZN represents a radical selected from the group consisting of the amino group and the acetyl amino group.

2. As a new compound, 2-$N^4$-acetyl-sulfanilamido-5-bromothiazole, having the formula:

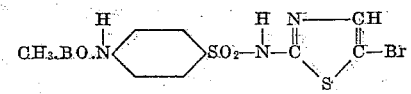

3. As a new compound, 2-sulfanilamido-5-bromothiazole, having the formula:

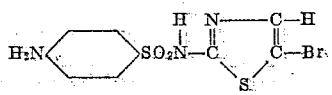

LUCAS P. KYRIDES.
FERDINAND B. ZIENTY.

REFERENCES CITED

The following references are of record in the file of this patent:

UNITED STATES PATENTS

| Number | Name | Date |
|---|---|---|
| 2,332,906 | Foldi et al. | Oct. 26, 1943 |
| 2,358,031 | Roblin et al. | Sept. 12, 1944 |

OTHER REFERENCES

Berichte, vol. 72-B, pp. 1470-1476 (1939).
Chem. Abs. vol. 38 (April, 1944); page 1483 [Citing: Jensen et al. in Dansk. Tids. Farm. 15, 197-199 (1941)].
Wiselogel: "Survey of Antimalarial Drugs, 1941-1945" (J. W. Edwards; Ann Arbor, Mich., 1946), vol. II, part I, page 928.

Certificate of Correction

Patent No. 2,537,592 January 9, 1951

LUCAS P. KYRIDES ET AL.

It is hereby certified that error appears in the printed specification of the above numbered patent requiring correction as follows:

Column 5, line 3, for "30%" read *30°*; column 8, line 38, for that portion of the formula reading

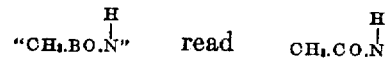

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*